(12) United States Patent
Krishna

(10) Patent No.: US 9,658,841 B2
(45) Date of Patent: May 23, 2017

(54) SYSTEM AND METHOD FOR EFFICIENT SOFTWARE REPLICATION

(75) Inventor: Nishant Krishna, Bihar (IN)

(73) Assignee: Avaya Inc., Basking Ridge, NJ (US)

( * ) Notice: Subject to any disclaimer, the term of this patent is extended or adjusted under 35 U.S.C. 154(b) by 778 days.

(21) Appl. No.: 13/599,177

(22) Filed: Aug. 30, 2012

(65) Prior Publication Data

US 2014/0068587 A1    Mar. 6, 2014

(51) Int. Cl.
G06F 9/44    (2006.01)
G06F 9/445   (2006.01)
G06F 11/14   (2006.01)

(52) U.S. Cl.
CPC ............ *G06F 8/65* (2013.01); *G06F 11/1433* (2013.01)

(58) Field of Classification Search
None
See application file for complete search history.

(56) References Cited

U.S. PATENT DOCUMENTS

| | | | |
|---|---|---|---|
| 6,134,587 A * | 10/2000 | Okanoue | 709/222 |
| 6,199,204 B1 * | 3/2001 | Donohue | 717/178 |
| 6,542,750 B2 | 4/2003 | Hendrey et al. | |
| 7,734,717 B2 * | 6/2010 | Saarimaki et al. | 709/217 |
| 8,024,723 B2 * | 9/2011 | Nahm et al. | 717/172 |
| 8,032,880 B2 * | 10/2011 | Konersmann et al. | 717/170 |
| 8,107,397 B1 * | 1/2012 | Bagchi | H04L 9/0822 370/254 |
| 8,321,858 B1 * | 11/2012 | Marmaros et al. | 717/173 |
| 2005/0278518 A1 * | 12/2005 | Ko | H04L 67/34 713/1 |
| 2006/0048130 A1 * | 3/2006 | Napier et al. | 717/168 |
| 2006/0130037 A1 * | 6/2006 | Mackay | 717/168 |
| 2007/0006214 A1 * | 1/2007 | Dubal et al. | 717/171 |
| 2008/0037442 A1 * | 2/2008 | Bill | 370/254 |
| 2008/0209414 A1 * | 8/2008 | Stein | 717/173 |
| 2008/0276301 A1 * | 11/2008 | Nataraj et al. | 726/3 |
| 2009/0183233 A1 * | 7/2009 | Trueba | 726/3 |
| 2009/0300595 A1 * | 12/2009 | Moran et al. | 717/170 |
| 2010/0035695 A1 * | 2/2010 | Douceur et al. | 463/42 |
| 2010/0121921 A1 | 5/2010 | Dunton | |
| 2010/0333082 A1 * | 12/2010 | Keys et al. | 717/173 |
| 2011/0029965 A1 * | 2/2011 | Lamba et al. | 717/172 |
| 2011/0041076 A1 * | 2/2011 | Sinn et al. | 715/745 |
| 2011/0106886 A1 * | 5/2011 | Nolterieke et al. | 709/204 |

(Continued)

*Primary Examiner* — H S Sough
*Assistant Examiner* — Timothy Duncan
(74) *Attorney, Agent, or Firm* — Sheridan Ross P.C.

(57) ABSTRACT

Systems and methods of efficient software replication are provided. This is accomplished by a first communication device that determines if a second communication device needs to have a software upgrade. In response to determining that the second communication device needs to have the software upgrade, the software upgrade is downloaded onto the second communication device. In response to downloading the software upgrade onto the second communication device, the second communication device determines if a third communication device needs to have the software upgrade. In response to determining that the third communication device needs to have the software upgrade, the second communication device downloads the software upgrade to the third communication device. This process can be repeated for any number of communication devices or the process may be completed in different orders.

20 Claims, 8 Drawing Sheets

(56) References Cited

U.S. PATENT DOCUMENTS

| | | | |
|---|---|---|---|
| 2011/0126185 A1* | 5/2011 | Waris et al. | 717/169 |
| 2011/0271091 A1* | 11/2011 | Andrews et al. | 713/100 |
| 2012/0072898 A1* | 3/2012 | Pappas et al. | 717/171 |
| 2012/0110568 A1* | 5/2012 | Abel et al. | 717/178 |

\* cited by examiner

SYSTEM AND METHOD FOR EFFICIENT SOFTWARE REPLICATION

TECHNICAL FIELD

Systems and methods that relate to software download systems and in particular to software download systems that replicate software are provided.

BACKGROUND

Using current processes, it can be very time consuming and inefficient for a company or manufacturing organization to create a large number of communication devices that have the same software and/or software configuration. Current processes typically download software from a single communication device to another communication device. Downloading a single communication device at a time can be slow and time consuming or require additional communication devices that are used for downloading the software.

This process can be even more difficult in an enterprise network where communication devices may be geographically distributed between locations. In this environment, downloading typically takes place from a centralized location. Like the above process, each communication device is individually downloaded from the central location. What is needed is a process that efficiently utilizes the communication devices that have already been downloaded.

SUMMARY

Systems and methods are provided to solve these and other problems and disadvantages of the prior art. In an embodiment, a first communication device determines if a second communication device needs to have a software upgrade. In response to determining that the second communication device needs to have the software upgrade, the software upgrade is downloaded from the first communication device to the second communication device.

In response to downloading the software upgrade onto the second communication device, the second communication device determines if a third communication device needs to have the software upgrade. In response to determining that the third communication device needs to have the software upgrade, the second communication device downloads the software upgrade onto the third communication device.

This process can be repeated for any number of communication devices or the process may be completed in different orders. For example if there are 4 communication devices, communication device 1 could download communication devices 1 and 3, and communication device 2 could download communication device 4.

In an embodiment, the software upgrade comprises a version of software upgrade and a version of upgrade patch software. A version of software for the communication device and a version of patch software for the communication device are determined. In response to determining the version of software for the communication device and the version of patch software for the communication device, the version of software upgrade is compared with the version of software for the communication device. Likewise, the version of upgrade patch software is compared with the version of patch software for the communication device. If the version of the software or patch software is less than the corresponding upgrade, the communication device is provided with the corresponding upgrade.

In an embodiment, the version of software upgrade matches the version of software for the communication device and the version of upgrade patch software is newer than the version of patch software for the communication device. The upgrade patch software is downloaded and the version of software upgrade is not downloaded.

In an embodiment, the version of software upgrade is newer than the version of software for the communication device. A licensing module determines if each communication device is licensed to download the version of software upgrade. If a communication device is determined to not be licensed, the software upgrade is not downloaded to the device.

In an embodiment, it is determined if a user is using the communication device to which the software upgrade is to be downloaded. In response to determining that the user is using the communication device, the download of the software upgrade is delayed for a period of time.

In an embodiment, an identifier that indicates whether to download the software upgrade to a communication device is determined. The identifier can be at least one of an Internet Protocol address, a Global Positioning Satellite location, a network address, a physical distance from the communication device, a wireless radio range of a communication device, a digital certificate, an address range, a list of communication devices, a list of Local Area Network addresses, a factory setting, and communication device number.

In an embodiment, the system confirms if the download is successful. If the download was not successful, the system attempts to re-download the software upgrade.

In an embodiment, the downloading is only done once per communication device. Alternatively, each communication device can download a plurality of software upgrades.

In an embodiment a system comprises a robot, which includes a movement mechanism, the movement mechanism is configured to physically move the robot into a physical proximity with a plurality of communication devices.

The robot includes a wireless interface; the wireless interface is configured to detect a first communication device of the plurality of communication devices. The robot includes a replication module; the replication module determines if a first communication device needs to have a software upgrade in response to detecting the first communication device is in physical proximity to the robot. The replication module is also configured to download the software upgrade onto the first communication device in response to determining that the first communication device needs to have the software upgrade. The replication module is configured to download the plurality of communication devices each time one of the plurality of communication devices is detected in the physical proximity of the robot.

DETAILED DESCRIPTION

Figure 1:
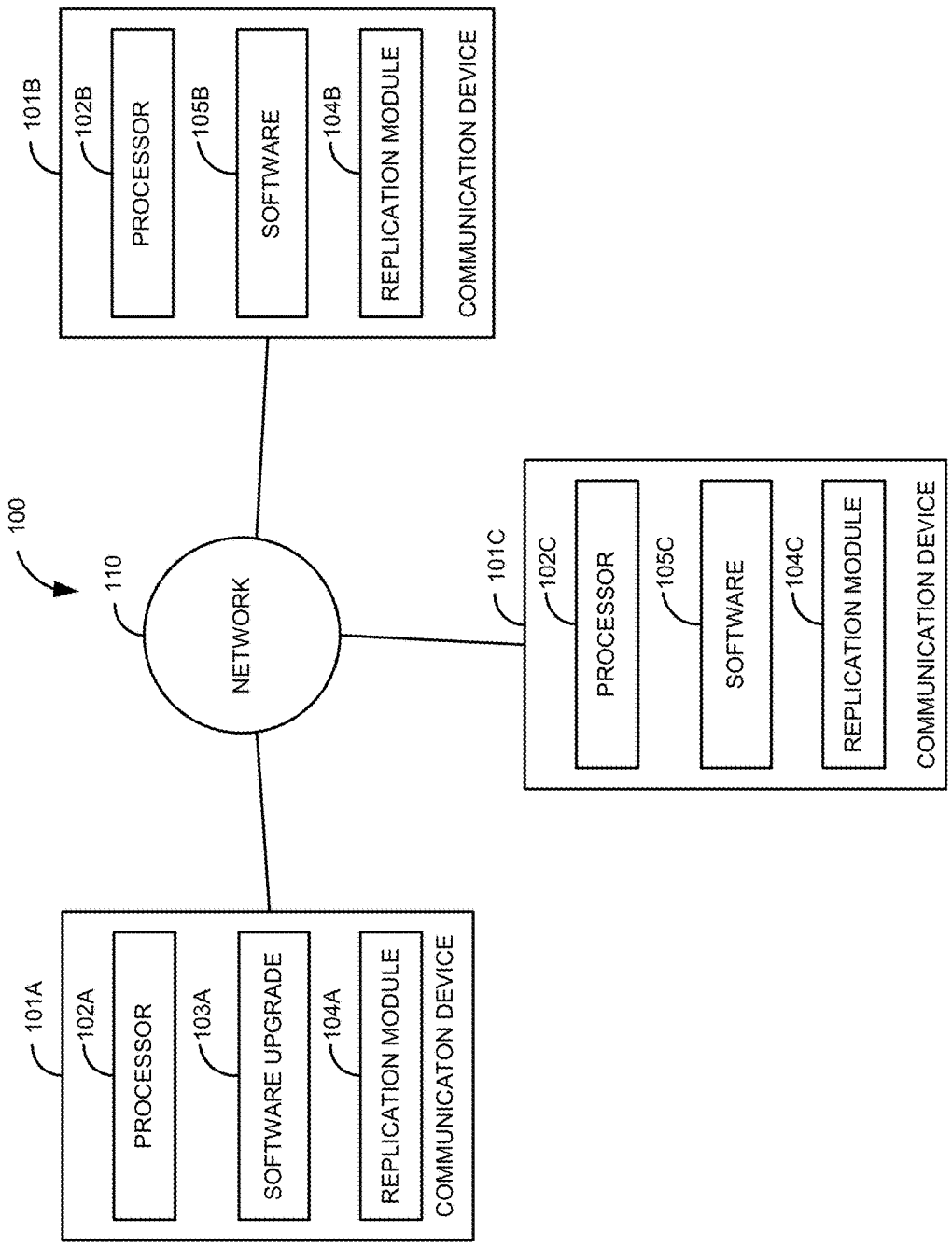
FIG. 1 is a block diagram of a first illustrative system for replicating software.

FIG. 1 is a block diagram of a first illustrative system 100 for replicating software. The first illustrative system 100 comprises communication devices 101A-101C and network 110.

Communication devices 101A-101C can be any communication device 101 that can communicate on network 110. For example, communication device 101 can be a telephone, a Personal Digital Assistant (PDA), a server, a router, a Personal Computer (PC), a lap-top computer, a tablet device, a Private Branch Exchange (PBX), a communication system, and/or the like. Although only three communication devices 101A-101C are shown, the first illustrative system may comprise any number of communication devices 101.

Communication device 101A comprises processor 102A, software upgrade 103A, and replication module 104A. Processor 102 can be any device that can process software such as a microprocessor, a Digital Signaling Processor (DSP), a multi-core processor, a computer, and/or the like. Software upgrade 103A can be any type of software that can be downloaded onto communication device 101. For example, software upgrade 103A can include software to upgrade an operating system, software to patch an operating system, a software application, a configuration file, a user profile, a document, a spreadsheet, and/or the like.

Replication module 104 can be any hardware/software that can replicate software upgrade 103 to another communication device 101. Although replication module 104 is shown in communication devices 101B and 101C, communication devices 101B and 101C may not contain replication module 104. In other embodiments, only a subset of replication module 104 is included in communication devices 101B and 101C. For example, replication module 104C may only contain a download portion of replication module 104. In one embodiment, part or all of replication module 104 may be downloaded onto a communication device 101 to allow communication device 101 to replicate software upgrade 103 to another communication device 101.

Communication devices 101B-101C further comprise software 105. Software 105 can be any software like described above with software upgrade 103. Software 105 can be the same as software upgrade 103. Software 105 can be a different version of software upgrade 103. Software 105 can contain a patch version of software that is different from a patch version of software in software upgrade 103. Communication devices 101B-101C are shown to comprise software 105. However, in an embodiment, a communication device 101B-101C does not contain software 105.

Network 110 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. Network 110 can use a variety of protocols, such as Ethernet, Internet Protocol (IP), Session Initiation Protocol (SIP), Integrated Services Digital Network (ISDN), and the like.

Communication device 101A determines if communication device 101B needs to have software upgrade 103A. Communication device 101A can determine that communication device 101B needs to have software upgrade 103A in various ways. For example, communication device 101A can send a message to communication device 101B. Communication device 101B can then send a response indicating that communication device 101B needs software upgrade 103. Alternatively, communication device 101B may periodically send out a message indicating that communication device needs software upgrade 103. In addition, communication device 101A can determine that communication device 101B needs software upgrade 103A based on different versions of software upgrade 103A, different versions of patch software, dates of software upgrade 103, sizes of software upgrade 103, and/or the like.

In response to determining that communication device 101B needs software upgrade 103A, replication module 104A downloads software upgrade 103A onto communication device 101B. When software upgrade 103A is downloaded onto communication device 101B, communication device 101B may replace software 105B with software upgrade 103A. Alternatively, communication device 101B may keep software 105B as a back-up version.

Software upgrade 103A, in addition to containing upgrade software, can also include part or all of replication module 104A. Alternatively, software upgrade 103A may only include replication module 104A. For example, software upgrade 103A may be a new version of replication module 104A.

In response to downloading software upgrade 103A onto communication device 101B, communication device 101B determines if communication device 101C needs to have software upgrade 103A. This can be accomplished using the same processes described above for the download between communication devices 101A and 101B. In response to determining that communication device 101C needs to have software upgrade 103A, communication device 101B downloads software upgrade 103A to communication device 101C. This process can be repeated for any number of additional communication devices 101. In one embodiment, once communication device 101 has downloaded another communication device 101 that communication device 101 will no longer download another communication device 101 with the same version of software upgrade 103. Alternatively, once communication device 101 has downloaded another communication device 101, communication device 101 can repeat the process for any number of additional communication devices 101.

Figure 2:
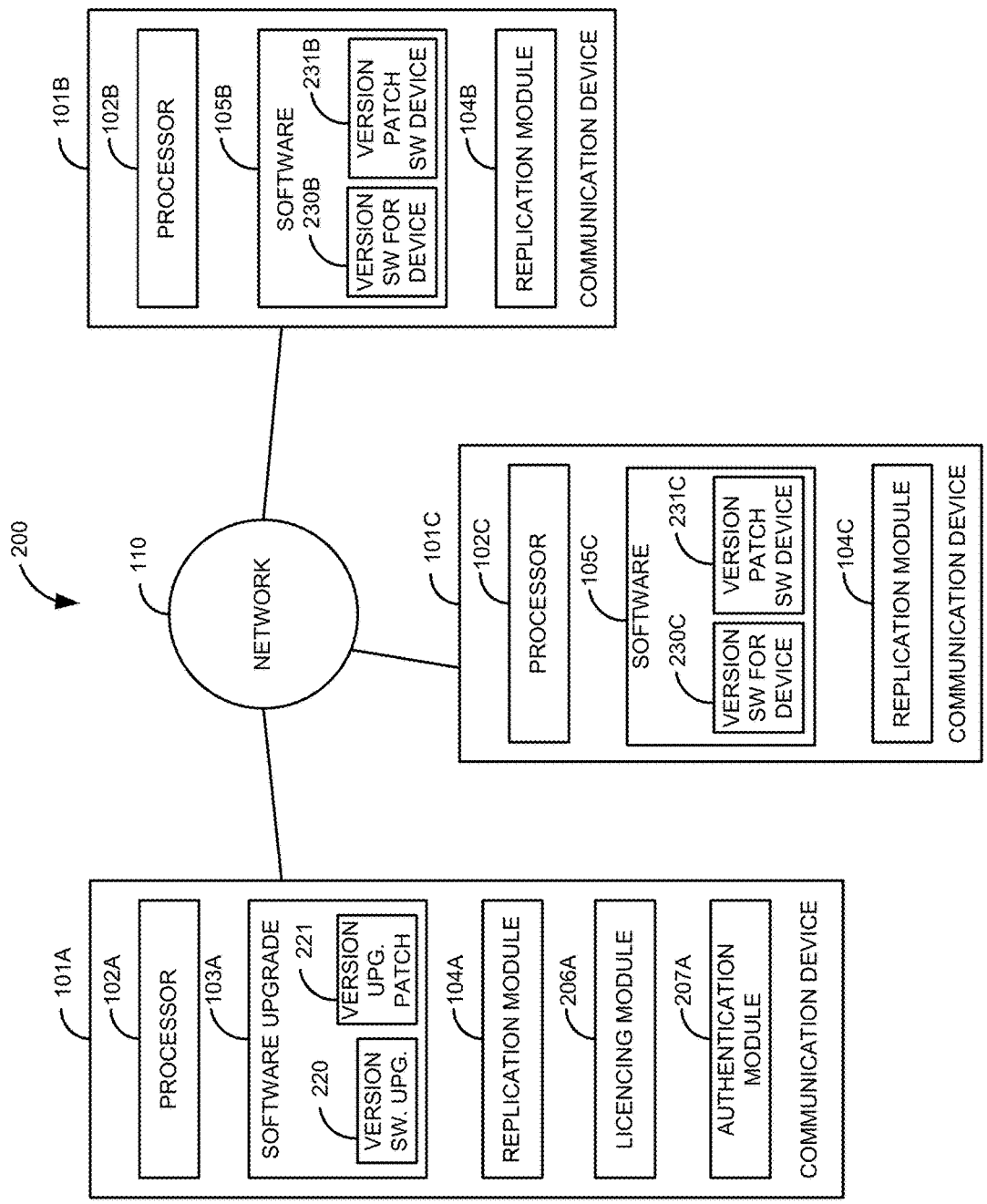
FIG. 2 is a block diagram of a second illustrative system for replicating software.

FIG. 2 is a block diagram of a second illustrative system 200 for replicating software. Second illustrative system 200 comprises communication devices 101A-101C and network 110. In FIG. 2, communication device 101A further comprises licensing module 206A and authentication module 207A. Software upgrade 103A also comprises a version of software upgrade 220 and a version of upgrade patch software 221. Typically a software upgrade 220 is a completely new download or a significant download of the previously software. A version of upgrade patch software typically is an update that only modifies a small portion of the files that are in a software load. Likewise, software 105B and 105C also comprise a version of software 230 and a version of patch software 231 for each device respectively.

Replication module 104A determines a version of software 230B and a version of patch software 231B for communication device 101B. Replication module 104A can determine the version of software 230B by querying communication device 101B, receiving a message from communication device 101B, and/or the like. Replication module 104A compares the version of software upgrade 220 to the version of software 230B for communication device 101B. Replication module 104A can also compare the version of upgrade patch software 221 with the version of patch software 231B for communication device 101B.

If the version of software upgrade 220 matches the version of software 230 for communication device 101B and the version of upgrade patch software 221 is newer than the version of patch software 231B for communication device 101B, replication module 104A can download the version of upgrade patch software 221 to communication device 101B.

If the version of software upgrade 220 is newer than the version of software 230B for communication device 101B, licensing module 206A determines if communication device 101B is licensed to download the version of software upgrade 220. Licensing module 206 can determine if communication device 101B is licensed to download the version of software upgrade 220 by working with authentication module 207. For example, authentication module 207A can confirm that communication device 101B is a valid communication device 101 for downloading based on credentials provided by communication device 101. For example, the credentials may be a digital certificate, a password, a license identifier, and/or the like.

If communication device 101B is licensed to download the version of software upgrade 220, replication module 104A downloads the version of software upgrade 220 to communication device 101B. Otherwise, if communication device 101B is not licensed to download the version of software upgrade 220, the version of software upgrade 220 is not downloaded onto communication device 101B. Licensing module 206A can also be downloaded as part of software upgrade 103A. In addition to licensing module 206A, any associated licenses/configuration information can also be downloaded to communication device 101B as part of the replication process.

Replication module 104A, before downloading the version of software upgrade 220 or the version of upgrade patch software 221, can determine if a user is using communication device 101B. This can be done in various ways such as communication device 101A querying communication device 101B. Communication device 101B can determine if a user is using communication device 101B in various ways, such as detecting a login at communication device 101B, identifying a user at communication device 101B (e.g., via a video camera, audio detection, key presses, etc.), an event in the user's calendar, an email, a posting on a blog site, and/or the like. If it is determined that the user is using communication device 101B, replication module 104A can delay downloading communication device 101B for a period of time. Delaying the download can be based on various factors such as the calendar event, no longer detecting the presence of the user, no longer detecting an action of the user, a defined time period, no longer detecting movement of the user, detecting a logout by the user, and/or the like.

Replication module 104 can also determine an identifier that indicates whether to download the software to communication device 101. The identifier can be based on various attributes such as an Internet Protocol (IP) address, a Global Positioning Satellite (GPS) location, a network address, a physical distance from communication device 101, a wireless radio range of communication device 101, a digital certificate, an address range, a list of communication devices, a list of Local Area Network addresses, a factory setting, and communication device number. For example, communication device 101A will only download communication devices 101 that are within a specific set of GPS coordinates or based on communication device 101 having a specific IP address.

In the above processes, if the software download is not successful, replication module 104A can attempt to re-download software upgrade 103A. If this continues to fail, the process can end. For example, if the attempt to re-download communication 101B fails 3 times, the process will end.

Figure 3:
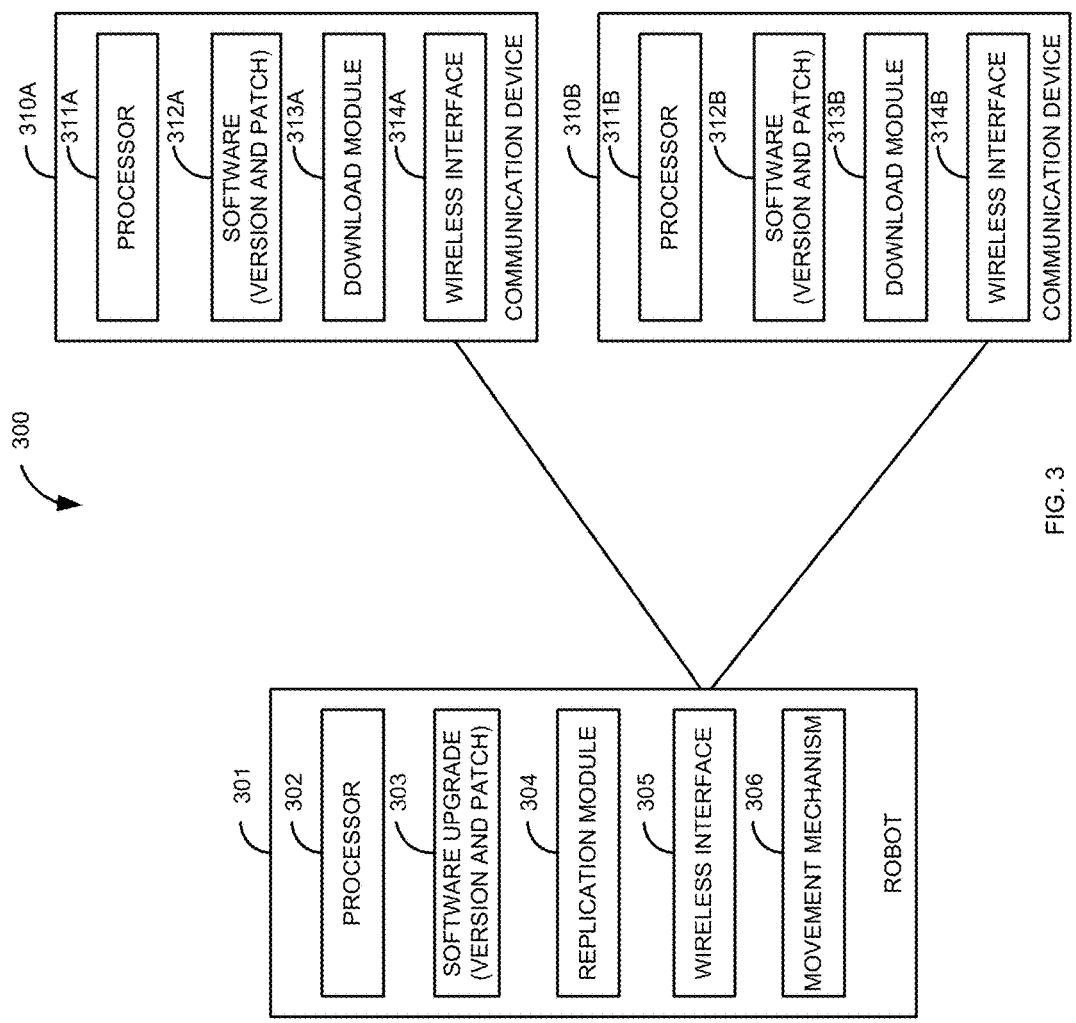
FIG. 3 is a block diagram of an illustrative system for replicating software using a robot.

FIG. 3 is a block diagram of an illustrative system 300 for replicating software using robot 301. Illustrative system 300 includes robot 301 and communication devices 310A-310B. Robot 301 comprises processor 302, software upgrade 303 replication module 304, wireless interface 305, and movement mechanism 306.

Software upgrade 303 may also include version and patch information such as described above. Replication module 304 can include any hardware/software that can replicate software. Wireless interface 305 can be any wireless interface that can communicate with communication device 310A-310B. For example, wireless interface 305 can comprise a cellular interface, a WiFi interface, an 802.11 interface, a BLUETOOTH interface, an RFID detector, a broadband wireless interface, an optical scanner and/or the like. Although shown using wireless interface 305 and 314, illustrative system 300 can use wired, optical, or other types of interfaces. Movement mechanism 306 and be any mechanism that can move robot 301 such as a set of wheels, a track, a hydraulic system, a mechanical apparatus, and/or the like.

Communication devices 310A-310B comprise processor 311, software 312, download module 313, and wireless interface 314. Software 312, like software 105 can comprise a software version and patch version. Download module 313 can be any hardware/software that can download software. Download module 313 can be replication module 304. Wireless interface 314 can be any wireless interface described above in regard to wireless interface 305. Although robot 301 is shown directly communicating with communication devices 310A-310B, a network, such as network 110 may be used to connect robot 301 with communication devices 310A-310B.

Wireless interface 305 is configured to detect communication devices 310A-310B. In response to detecting communication device 310A is in a physical proximity to robot 301, replication module 304 determines if communication device 310A needs to have a software upgrade. Determining that communication device 310A is in physical proximity to robot 301 can be accomplished in various ways, such as detecting a radio frequency from communication device 101A, detecting communication device 310A via a video camera, reading a bar code, and/or the like. Determining that communication device 310A needs to have a software upgrade can be accomplished in similar ways as described previously.

Replication module 304 is configured to download communication devices 310A-310B each time one of the communication devices 310A-301B is detected in the physical proximity of the robot (that is if communication devices 310A-310B have not been downloaded previously). In addition, the process of using a robot 301 can be implemented using previously described processes. For example, the robotic system can use the previously described processes of attempting to re-download, complying with licenses, downloading based on license version and patch version, and/or the like.

Figure 4:
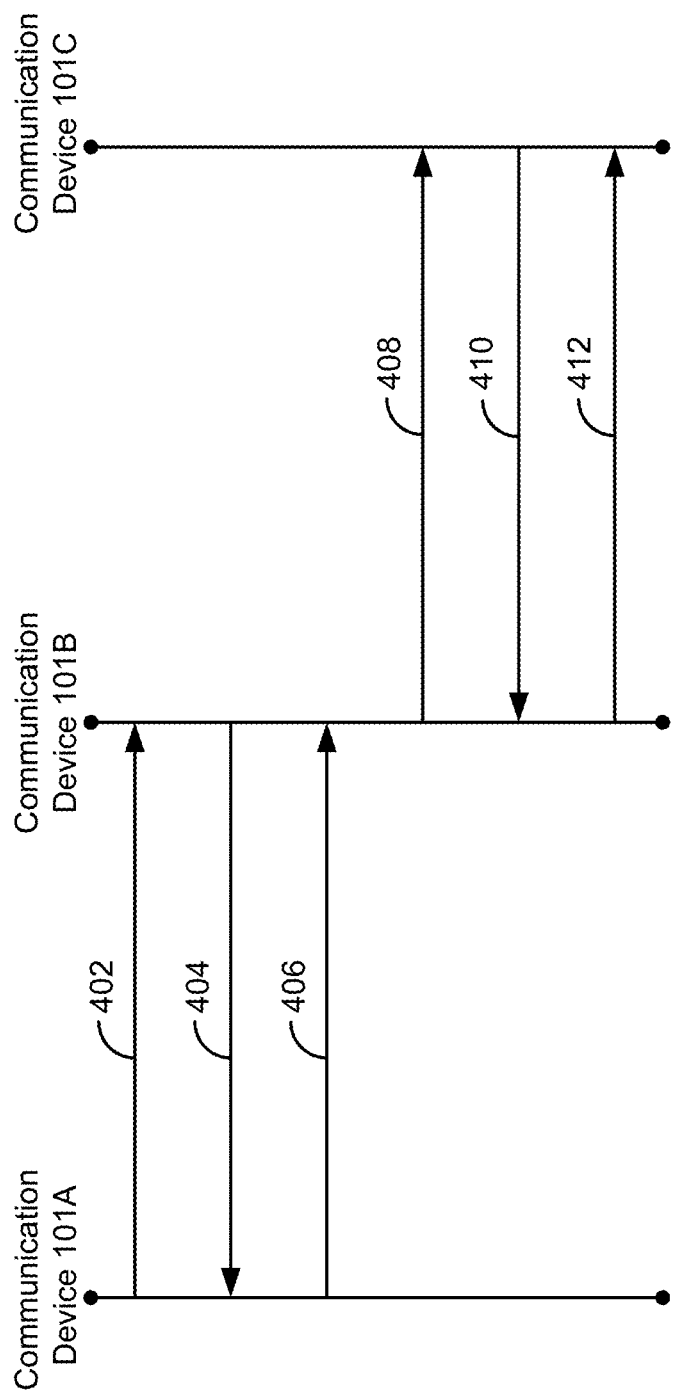
FIG. 4 is a flow diagram of a method for replicating software.
Figure 5:
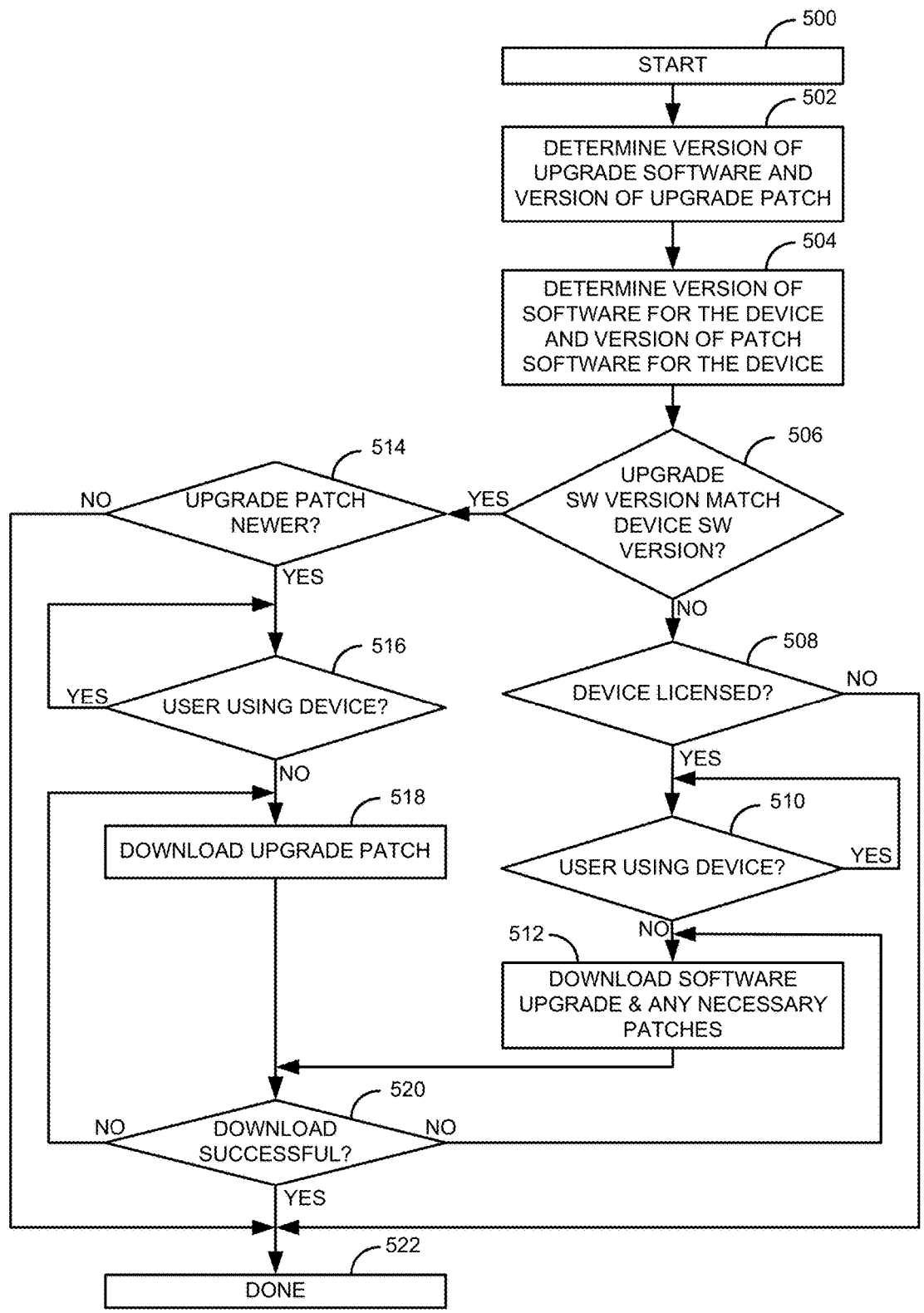
FIG. 5 is an enhanced flow diagram of a method for replicating software.
Figure 6:
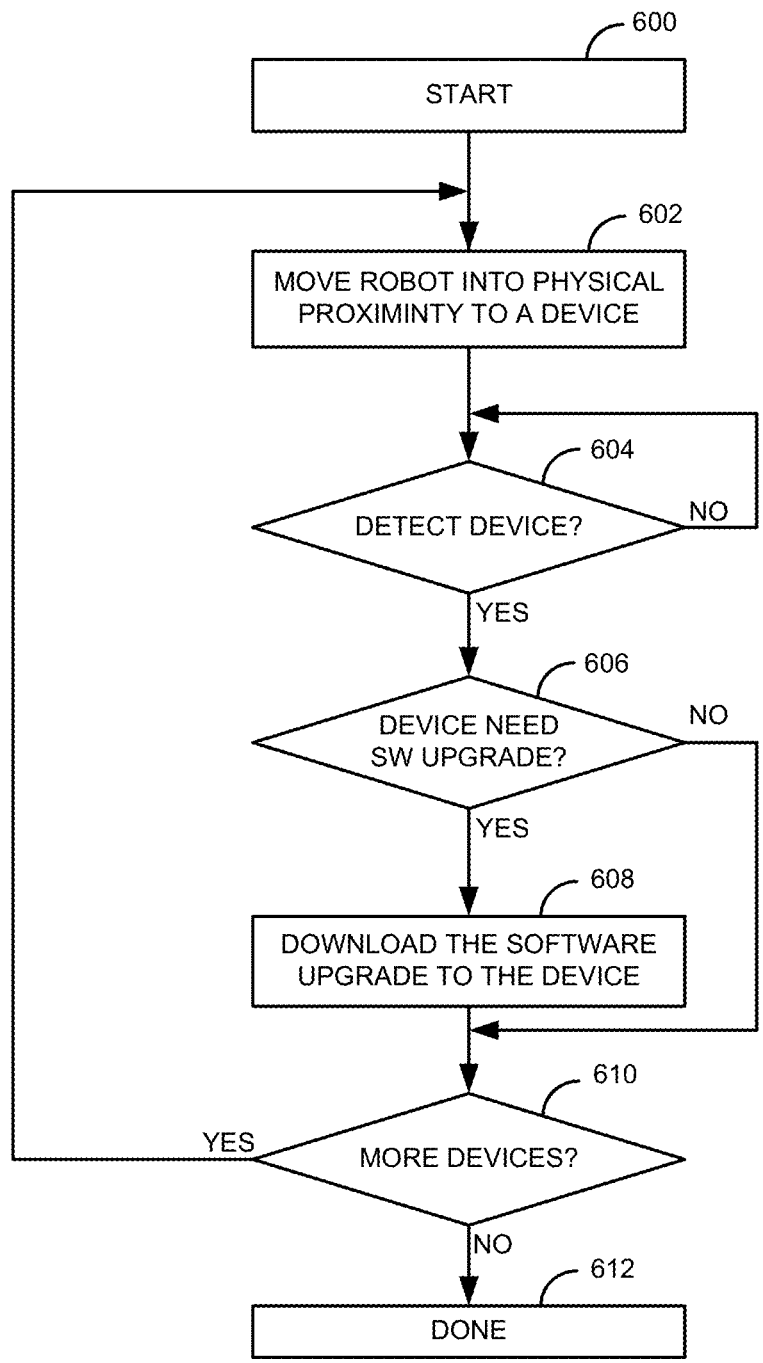
FIG. 6 is a flow diagram of a method for replicating software.

FIG. 4 is a flow diagram of a method for replicating software. Illustratively, communication device 101, communication device 310, robot 301, and the elements contained in each are stored-program-controlled entities, such as a computer or processor, which performs the method of FIGS. 4-6 and the processes described herein by executing program instructions stored in a non-transient computer readable storage medium, such as a memory or disk. Although the methods described in FIGS. 4-6 are shown in a specific order, one of skill in the art would recognize that the steps in FIGS. 4-6 may be implemented in different orders and/or be implemented in a multi-threaded environment. Moreover, various steps may be omitted or added based on implementation Communication device 101A determines 402 if communication device 101B needs to have the software upgrade by sending a query to communication device 101B. For example, communication device 101A can send out a broadcast message on network 110. Communication device 101B responds 404 by sending a response indicating whether communication device 101B needs to be upgraded. In addition, communication device 101A can determine if communication device 101B needs have the software upgrade based on other factors such as a physical proximity of communication devices 101A and 101B, a number of hops between communication devices 101A and 101B, if communication device 101A and communication device 101B are on the same network or sub-network, based on a subnet mask, based on a MAC address, and/or the like.

In response to determining that communication device 101B needs the software upgrade, communication device 101A downloads 406 the software upgrade onto communication device 101B. In response to downloading the software upgrade onto communication device 101B, communication device 101B determines 408 if communication device 101C needs to have the software upgrade by sending a query to communication device 101C. Communication device 101C responds 410 by sending a response indicating whether communication device 101C needs to be upgraded. In response to determining that communication device 101C needs to have the software upgrade, communication device 101B downloads 412 the software upgrade to communication device 101C. This process can be repeated for any number of additional communication devices 101.

FIG. 5 is an enhanced flow diagram of a method for replicating software. The process described in FIG. 5 can be used for downloading software upgrade 103 onto a communication device 101. The process starts in step 500. Communication device 101A determines 502 a version of upgrade software and a version of upgrade patch software. Communication device 101A determines 504 a version of software and a version of patch software for communication device 101B.

In step 506, communication device 101A compares the version of upgrade software to version of software for communication device 101B. If the versions do not match in step 506 (i.e., the version of upgrade software is newer), communication device 101A determines 508 if communication device 101B is licensed to download the version of upgrade software. If communication device 101B is not licensed to download the version of upgrade software in step 508, the process is done 522.

Otherwise, if communication device 101B is licensed to download the version of upgrade software in step 508, communication device 101A determines 510 if a user is using communication device 101B. If the user is using communication device 101B in step 510, the process waits for a period of time until the user is no longer using communication device 101B. Instead of waiting for a period of time, communication device 101B can alternatively go into a quiet mode after giving the user a warning. Communication device 101B can give the user a final warning before proceeding with the upgrade. Each of these can be configurable. Otherwise, if the user is not using communication device 101B in step 510, communication device 101A downloads 512 the version of software upgrade and any necessary patches.

Communication device 101A confirms 520 if the download was successful. If the download was successful in step 520, the process is done 522. If the download was not successful in step 520, the process goes to step 512 (if that was the previous download step). If the download fails for a defined number of times, the process can be done 522.

If the versions match in step 506, communication device 101A determines 514 if the version of upgrade patch software is newer that the patch software for communication device 101B. If the version of upgrade patch software is not newer in step 514, the process is done 522. Otherwise, if the version of upgrade patch software is newer in step 514, communication device 101A determines 516 if the user is using communication device 101B. If the user is using communication device 101B in step 516, the process waits for a period of time until the user is no longer using communication device 101B. Instead of waiting for a period of time, communication device 101B can alternatively go into a quiet mode after giving the user a warning. Communication device 101B can give the user a final warning before proceeding with downloading the patch. Each of these can be configurable.

Otherwise, if the user is not using communication device 101B in step 516, communication device 101A downloads 518 the upgrade patch software onto communication device 101B. If the upgrade patch software was downloaded successfully in step 520, the process is done 522. Otherwise, if the upgrade patch software was not downloaded successfully in step 520, the process goes to step 518.

FIG. 6 is a flow diagram of a method for replicating software. The process starts in step 600. Robot 301 is moved 602 into physical proximity to communication device 310A. Robot 301 detects 604 if communication device 310A-310B is in physical proximity to robot 301 in step 604. If none of communication devices 310A-310B are in physical proximity (or cannot be detected), the process repeats step 604.

Otherwise, if robot 301 detects communication device 310A (or 310B) in physical proximity to robot 301 in step 604, robot 301 determines if communication device 310A needs a software upgrade. If communication device 310A does not need a software upgrade, the process goes to step 610. Otherwise, if communication device 310A needs a software upgrade in step 606, robot 301 downloads 608 the software upgrade onto the communication device 310A and the process goes to step 610.

Robot 301 in step 610 determines if there are more communication devices 310 that need to be downloaded. If there are additional communication devices 310 that need to be downloaded in step 610, the process goes to step 602. Otherwise, the process is done 612.

Robot 301 can move in relation to communication devices 310 based on various information. For example, robot 301 can use a predefined map of where communication devices 310 are located on a factory floor. Alternatively, robot 301 may be stationary and communication devices 310 may be moved to robot 310 (i.e., via an assembly line).

Figure 7:
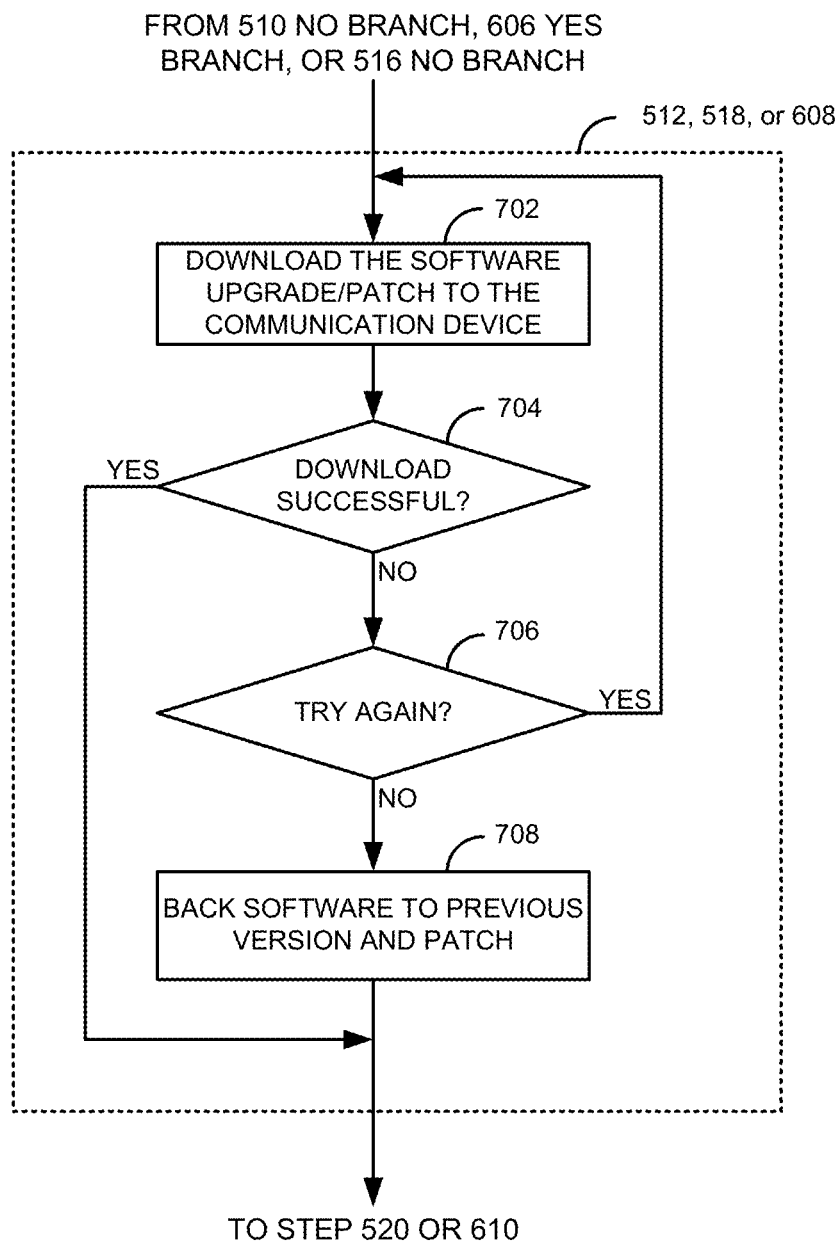
FIG. 7 is a flow diagram of a method for verifying replication of software.

FIG. 7 is a flow diagram of a method for verifying replication of software. FIG. 7 is an expanded view of an exemplary embodiment for any of steps 512, 518, or 608. After detecting that communication device 101B that the user in not using communication device 101B in step 510 or 516 (or from step 604 yes branch), the software upgrade/patch is downloaded 702 onto communication device 101B. If the download is successful in step 704, the process goes to step 520 (or step 610).

Otherwise, if the download is not successful in step 704, the process determines in step 706 if the software upgrade/patch should be downloaded again. If the software upgrade/patch is to be downloaded again, the process goes to step 702. In step 706, the number of times and reasons why to download software upgrade/patch can be accomplished based on various reasons, such as how the download failed, a defined number of tries, a quality of service in a network, a network status, a network failure, and/or the like.

Otherwise, if it is determined in step 706 to not try again, communication device 101B backs the software to the previous version and patch. This can be accomplished by keeping the previous copy until it is determined that the download was successful. The process then goes to step 520 (or step 610).

Figure 8:
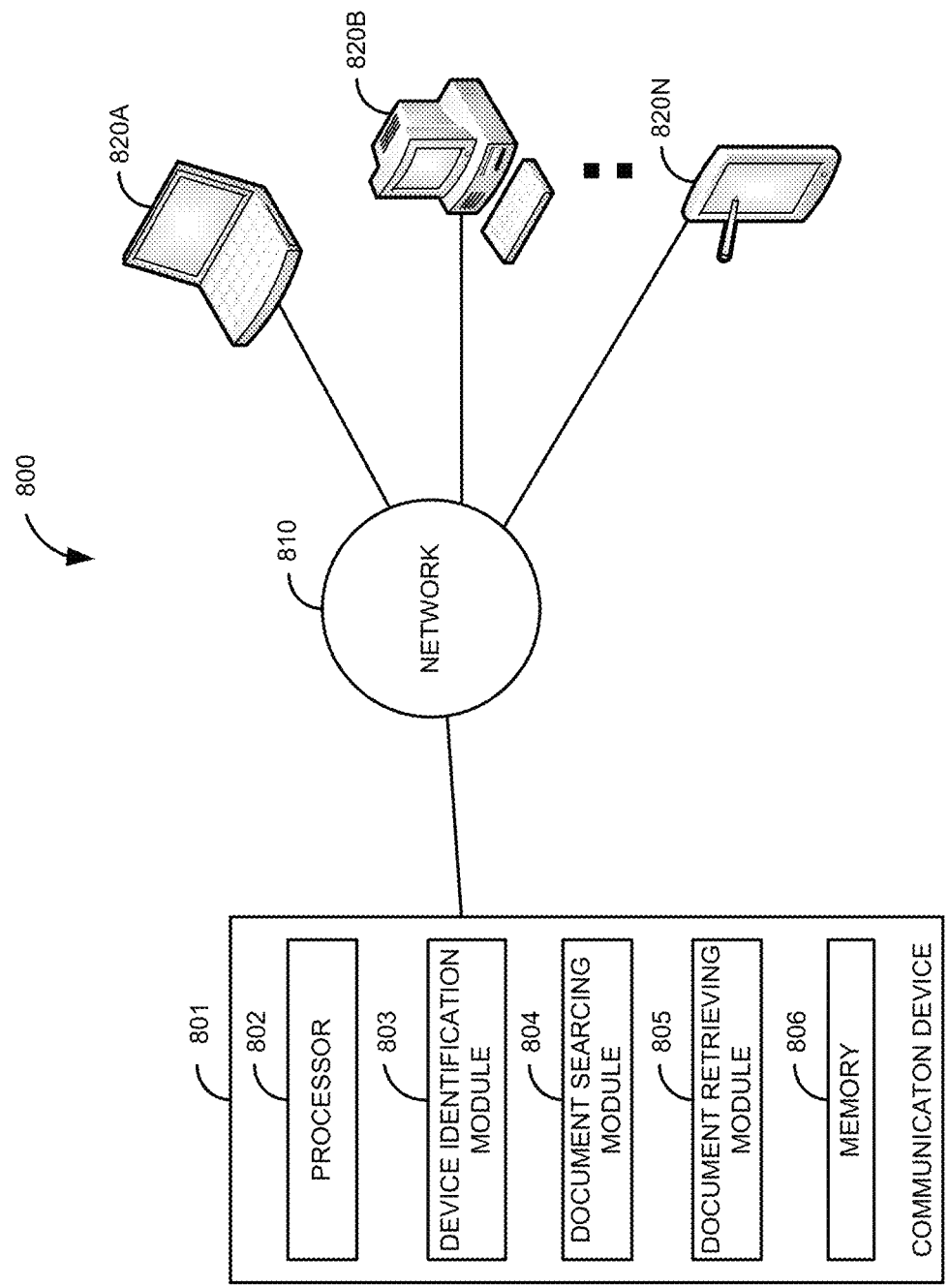
FIG. 8 is a block diagram of a third illustrative system for retrieving documents on a network.

FIG. 8 is a block diagram of a third illustrative system 800 for retrieving documents or other information (e.g., software, updates, tools, accessories) on a network. The third illustrative system 800 comprises communication device 801, network 810, and network devices 820A-820N. Communication device 801 can be any communication device 801 that can communicate on network 810. For example, communication device 801 can be a server, a telephone, a robot, a Personal Digital Assistant (PDA), a server, a router, a Personal Computer (PC), a lap-top computer, a tablet device, a Private Branch Exchange (PBX), a communication system, and/or the like.

Communication device 801 comprises processor 802, device identification module 803, document searching module 804, document retrieving module 805, and memory 806. In another embodiment, document searching module 804 can search for other information, such as software, updates, tools, accessories; and document retrieving module 805 can retrieve other information, such as software, updates, tools, and accessories. Processor 802 can be any device that can process software such as a microprocessor, a Digital Signaling Processor (DSP), a multi-core processor, a computer, and/or the like. Device identification module 803 can be any hardware/software that can identify a network device 820. Document searching module 804 can be any hardware/software that can identify a document or other information, such as software, updates, tools, and accessories, on a network device 820. Document retrieving module 805 can be any hardware/software that can retrieve documents or other information, such as software, updates, tools, and accessories, from a network device 820. Memory 806 can be any memory that can store documents, such as a read write memory, a storage disk, a flash memory, a memory stick, and the like.

Network 810 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. Network 810 can use a variety of protocols, such as Ethernet, Internet Protocol (IP), Session Initiation Protocol (SIP), Integrated Services Digital Network (ISDN), and the like.

Network device 820 can be any device that can communicate on network 810. For example, network device 820 can be a telephone, a Personal Digital Assistant (PDA), a server, a router, a Personal Computer (PC), a lap-top computer, a tablet device, a Private Branch Exchange (PBX), a communication system, and/or the like. Although only three network devices 820A-820N are shown, the first illustrative system may comprise any number of network devices 820.

The third illustrative system 800 can be used to search network 810 for various documents or other information or other information, such as software, updates, tools, and accessories, and devices that meet defined criteria. For example, in support of litigation, communication device 801 can be used to search network devices 801A-801N for various documents that meet specific criteria involved with the litigation.

Device identification module 803 is configured to identify one or more network devices 820 that meet a first set of defined criteria. For example, the first set of defined criteria can be based on specific users of network devices 820A-820N, specific Internet Protocol (IP) addresses, specific dates that network devices 820A-820N were downloaded, specific times that network devices 820A-820N were used by a specific user, a physical location of network devices 820A-820N, a type of network device, and the like.

Device identification module 803 determines if a user is using the identified one or more network devices 820. If the user is not using the one or more identified network devices, document searching module 804 searches the identified one or more network devices 820 for one or more documents or other information that meet a second set of defined criteria. A document can be anything that stores a group of information, such as a file, an email, a spreadsheet, a text message, a recorded message, a recorded video communication, and/or the like. The second set of defined criteria can be any criteria that can identify a document or other information. For example, the second set of defined criteria can be based on a document date, a document size, a document type, a date a document was created, a date a document was modified, an owner of a document, an owner of a modification to the document, and/or the like.

Document retrieving module 805 retrieves the one or more identified documents on network devices 820A-820N. The retrieved documents are stored in memory 806. A user can then view the stored documents.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
    determining, from a first communication device, if a second communication device needs to have a software upgrade, wherein the determination if the second communication device needs to have a software upgrade is also based on a number of hops between the first communication device and the second communication device;
    in response to determining that the second communication device needs to have the software upgrade, downloading, from the first communication device, the software upgrade onto the second communication device;
    in response to downloading the software upgrade onto the second communication device, the second communication device determining if a third communication device needs to have the software upgrade; and in response to determining that the third communication device needs to have the software upgrade, downloading, from the second communication device, the software upgrade to the third communication device.

2. The method of claim 1, wherein the software upgrade comprises a version of software upgrade and a version of upgrade patch software and the determining steps comprise:

determining for each communication device to receive a version of software to be downloaded to the communication device and a version of patch software to be downloaded to the communication device; and in response to determining the version of software to be downloaded to the communication device and the version of patch software to be downloaded to the communication device to be downloaded, comparing the version of software upgrade with the version of software on the communication device to receive a download and comparing the version of upgrade patch software with the version of patch software for the communication device to receive a download.

3. The method of claim 2, wherein the version of software upgrade matches the version of software for the communication device to receive a download and the version of upgrade patch software is newer than the version of patch software for the communication device to receive a download, and wherein the downloading steps comprise downloading the upgrade patch software and not downloading the version of software upgrade.

4. The method of claim 2, wherein the version of software upgrade is newer than the version of software for the communication device to be downloaded and further comprising the steps of:

determining if each communication device to receive a download is licensed to download the version of software upgrade;

in response to determining that each communication device to receive a download is not licensed to download the version of software upgrade, not downloading the version of software upgrade.

5. The method of claim 1, wherein the determining steps further comprise:

determining if a user is using the second or third communication device to receive a download; and in response to determining that the user is using the second or third communication device to receive a download, delaying downloading the second or third communication device to receive a download until the user has not used the second or third communication device to be downloaded for a period of time.

6. The method of claim 5, wherein determining if the user is using the second or third communication device to receive a download comprises determining if the user has posted on a blog site.

7. The method of claim 1, wherein the determining steps further comprise:

determining an identifier that indicates whether to download the software upgrade to the second or third communication device to receive a download, wherein the identifier is at least one of the following: an Internet Protocol address, a Global Positioning Satellite location, a network address, a physical distance from second or third communication device, a wireless radio range of a communication device, a digital certificate, an address range, a list of communication devices, a list of Local Area Network addresses, a factory setting, and a communication device number.

8. The method of claim 7, wherein the identifier comprises the Global Positioning Satellite location.

9. The method of claim 7, wherein the identifier comprises the list of Local Area Network Addresses.

10. The method of claim 1, wherein the downloading steps further comprise the steps of:

confirming that the download was successful; and in response to confirming that the download was not successful, attempting to re-download the software upgrade.

11. The method of claim 1, wherein the downloading steps are only done once per communication device.

12. The method of claim 1, wherein the first and second communication devices each download to a plurality of other communication devices.

13. A plurality of communication devices comprising at least a first, second, and third communication device:

the first communication device comprising a first replication module configured to determine if a second communication device needs to have a software upgrade, wherein the determination if the second communication device needs to have a software upgrade is also based on a number of hops between the first communication device and the second communication device and configured to download the software upgrade onto the second communication device in response to determining that the second communication device needs to have the software upgrade; and the second communication device comprising a second replication module configured to determine if a third communication device needs to have the software upgrade in response to downloading the software upgrade onto the second communication device and configured to download the software upgrade to the third communication device in response to determining that the third communication device needs to have the software upgrade.

14. The plurality of communication devices in claim 13, wherein the software upgrade comprises a version of software upgrade and a version of upgrade patch software and the first and second replication modules are further configured to:

determine for each communication device to receive a download, a version of software for each communication device to receive a download and a version of patch software for each communication device to receive a download, and in response to determining the version of software for each communication device to receive a download and the version of patch software for each communication device to receive a download, compare the version of software upgrade with the version of software for each communication device to receive a download and compare the version of upgrade patch software with the version of patch software for each communication device to receive a download.

15. The plurality of communication devices of claim 14, wherein the version of software upgrade matches the version of software for each communication device to receive a download and the version of upgrade patch software is newer than the version of patch software for each communication device to receive a download, and wherein the first and second replication modules are further configured to download the upgrade patch software and not download the version of software upgrade.

16. The plurality of communication devices of claim 14, wherein the version of software upgrade is newer than the version of software for each communication device to receive a download and further comprising a licensing module in the plurality of communication devices, the licensing module configured to:
 determine if each communication device to receive a download is licensed to download the version of software upgrade and not download the version of software upgrade in response to determining that each communication device to receive a download is not licensed to download the version of software upgrade.

17. The plurality of communication devices of claim 13, wherein the first and second replication modules are further configured to: determine if a user is using each communication device to receive a download and delay downloading each communication device to receive a download until the user has not used the communication device to receive a download for a period of time.

18. The plurality of communication devices of claim 13, wherein the first and second replication modules are further configured to: determine an identifier that indicates whether to download the software upgrade to each communication device to receive a download, wherein the identifier is at least one of the following: an Internet Protocol address, a Global Positioning Satellite location, a network address, a physical distance from each communication device to receive a download, a wireless radio range of a communication device, a digital certificate, an address range, a list of communication devices, a list of Local Area Network addresses, a factory setting, and a communication device number.

19. The plurality of communication devices of claim 13, wherein the first and second replication modules are further configured to: confirm that the download is successful and attempt to re-download the software upgrade in response to determining the download was not successful.

20. The plurality of communication devices of claim 13, wherein the downloading steps are only done once per communication device.

* * * * *